United States Patent [19]

Möllenkamp

[11] Patent Number: 5,057,288

[45] Date of Patent: Oct. 15, 1991

[54] DEVICE FOR STERILIZING PRODUCTS PACKED IN CYLINDRICAL CONTAINERS

[75] Inventor: Daniël L. Möllenkamp, Amsterdam, Netherlands

[73] Assignee: Stork Amsterdam B.V., Amsterdam, Netherlands

[21] Appl. No.: 194,859

[22] Filed: May 17, 1988

[30] Foreign Application Priority Data

May 18, 1987 [NL] Netherlands ............ 8701189

[51] Int. Cl.⁵ .................................... B65G 25/00
[52] U.S. Cl. .................................... 422/310; 198/724;
414/151; 414/158; 414/433; 422/297; 422/304;
422/307
[58] Field of Search ............... 422/304, 307, 297, 310;
414/151, 158, 433; 198/724

[56] References Cited

U.S. PATENT DOCUMENTS

| 1,193,632 | 8/1916 | Thompson | 198/632 |
| 1,422,798 | 7/1922 | Thompson | 198/724 |
| 1,539,458 | 5/1925 | Berry | 414/151 |
| 1,546,045 | 7/1925 | Thompson | 198/724 |
| 2,081,446 | 5/1937 | Brett | 414/151 |
| 2,777,567 | 1/1957 | Russell | 198/724 |
| 3,181,692 | 5/1965 | Mencacci | 198/724 |

Primary Examiner—Robert J. Warden
Assistant Examiner—Timothy M. McMahon
Attorney, Agent, or Firm—Weintraub, DuRoss & Brady

[57] ABSTRACT

A device for sterilizing products packed in cylindrical containers, includes an elongate, essentially cylindrical housing and an essentially cylindrical rotor located therein which can be driven via a central shaft. The circumferential wall of the housing is provided on the inside with a helically running, raised rib. The rotor is designed as a cage having a plurality of rings placed behind each other, the center line of which coincides with the axis of the rotor, and a plurality of raised ribs fastened to the circumference of the rings parallel to the axis of the rotor. The outer edge of the ribs on the rotor is located near the inner edge of the helically running rib on the inner wall of the housing so that spaces are formed between the ribs for receiving the cylindrical containers. Within the rotor between neighboring rings bracing elements in the form of pipes are provided to reinforce the rotor.

4 Claims, 2 Drawing Sheets

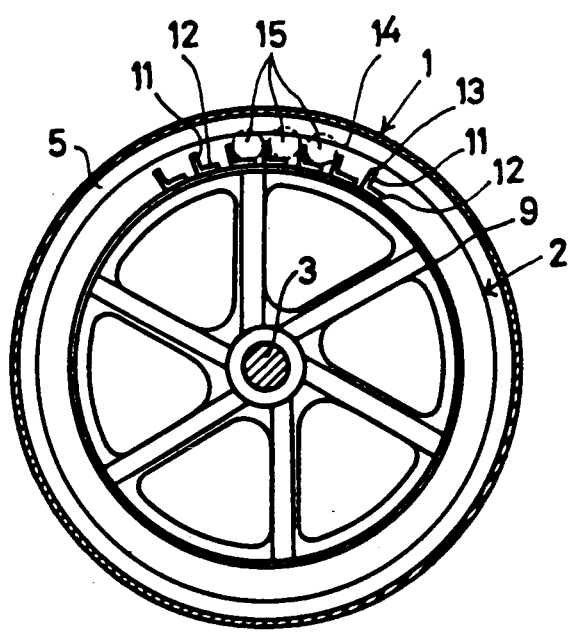
FIG:2.

DEVICE FOR STERILIZING PRODUCTS PACKED IN CYLINDRICAL CONTAINERS

BACKGROUND OF THE INVENTION

1. Field of the Invention:

The invention relates to a device for sterilizing products packed in cylindrical containers.

2. Prior Art:

Devices for sterilizing products packed in cylindrical containers comprising an elongate, essentially cylindrical housing and an essentially cylindrical rotor located therein which can be driven via a central shaft, the circumferential wall of the housing being provided on the inside with a helically running, raised rib and the rotor being designed as a cage consisting of a number of rings placed behind each other, the center line of which conincides with the axis of the rotor, and a number of raised ribs fastened to the circumference of the rings parallel to the axis of the rotor, the outer edge of which ribs is located near the inner edge of the helically running rib on the inner wall of the housing, so that spaces are formed between the ribs for receiving the cylindrical containers, and bracing elements which are at an angle relative to the rotor shaft being provided within the rotor between neighboring rings to reinforce the rotor, are known.

In this known device, the containers present between the ribs are moved in a circumferential direction by the rotation of the rotor. Because the housing is provided at the inside with a helical rib, the containers are, also, moved on in the longitudinal direction of the rotor. In view of the fact that the distance between the outer edge of the ribs present on the rotor and the helically running rib arranged against the inside of the circumferential wall of the housing is relatively small, it is necessary for the sagging through of the rotor to be within very narrow limits. For this purpose, the rotor of the known device is reinforced by means of a bracing element in the form of rods or wires which are fitted crosswise and under pre-tension between the neighboring rings of the rotor and together form a three-dimensional framework. However, a disadvantage of the known device is that, in fact, only one half of the bracing elements contribute to the reinforcement of the rotor, since the rods or wires can be subjected only to a tensile load and can absorb hardly any or no compressive forces. The relatively low flexural stiffness of such a rotor limits the usable length thereof, because the sag which occurs is limited in order to prevent excessive plays occurring in the guides for the containers. Furthermore, a rotor of this type has a limited torsional stiffness, as a result of which the rotor has to be driven at both ends.

SUMMARY OF THE INVENTION

It is, therefore, an object of the invention to provide rotation with higher flexural and torsional stiffness.

This is achieved with a device of the above-named type, which is characterized in that the bracing elements consist of pipes. The pipes can absorb both tensile forces and compressive forces. It is possible as a result of this to achieve, with the same weight of the rotor, higher flexural stiffness as well as greater torsional stiffness than in the known construction. It is also possible, with the same maximum sag, to make the rotor longer, which increases the capacity of the device. Moreover, using the new construction it is sufficient to drive the rotor at one end, whereas in the known device the rotor had to be driven at both ends.

Each pipe preferably comprises parts made of different materials, in a ratio such that the mean coefficient of expansion of the pipes is equal to the mean coefficient of expansion of the rings and the ribs of the rotor. This prevents temperature stresses from occurring in the rotor as the temperature increases, as was the case with the known device.

In a practical embodiment of the device, the rings of the rotor are made of steel and the ribs are made of stainless steel, and each pipe comprises, in part, steel and partly of stainless steel.

The invention also relates to a rotor intended for a device according to the invention for sterilizing products packed in cylindrical containers.

The invention will now be explained in detail by means of the description of an exemplary embodiment and with reference to the drawings.

BRIEF DESCRIPTION OF THE DRAWINGS

FIG. 2 is a cross section through the device of FIG. 1 along line II—II.

DETAILED DESCRIPTION OF THE PREFERRED EMBODIMENT

Figure 1:
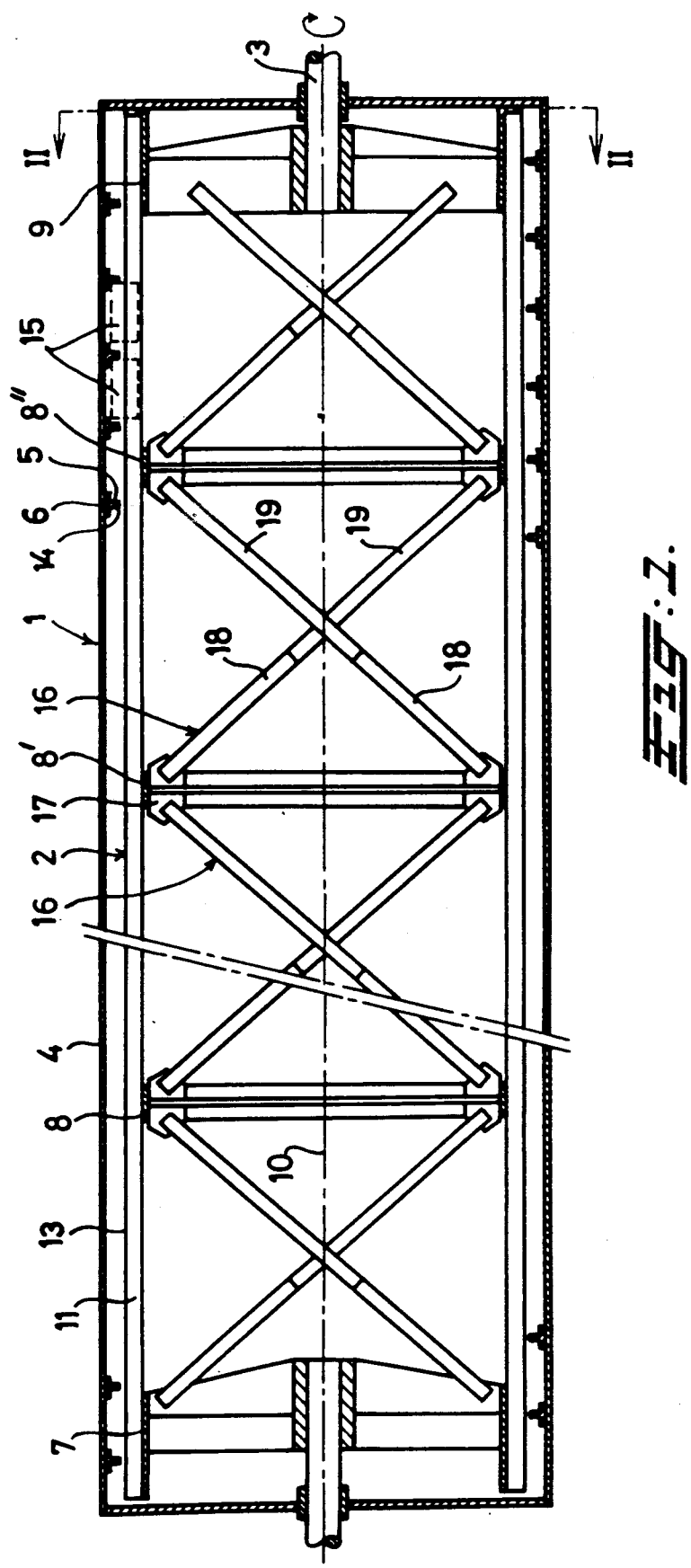
FIG. 1 is a diagrammatic longitudinal section of a device according to the invention.

The device shown in the figures for sterilizing products packed in cylindrical containers comprises an elongate, essentially cylindrical housing 1 and an essentially cylindrical rotor 2 located therein which can be driven via a central shaft 3. The circumferential wall 4 of the housing 2 is provided on the inside with a helically running raised rib 5. In the embodiment described, the raised rib 5 is formed by the body of a T-shaped section, the flange 6 of which is arranged against the inside of the circumferential wall 4. The rotor 2 is designed as a cage having a number of rings 7,8,8',8'',9 arranged behind each other, the center line of which coincides with the axis 10 of the rotor, and raised ribs 11 fastened on the circumference of the rings 7,8,8',8'',9 parallel to the axis 10 of the rotor. In the embodiment of the device described, each rib 11 is formed by a flange of an angled profile and fastened with the other flange 12 to the outer side of the rings 7,8,8',8'',9. The outer edge 13 of the ribs 11 is located close to the inner edge 14 of the helically running rib 5.

Spaces in which the containers 15 to be sterilized can be received are formed between the ribs 11 and the helically running rib 5. A number of these containers are shown by broken lines in the figures. By rotating the rotor 2 about the axis 10, the containers 15 are moved in the circumferential direction through a helical groove which is formed by the helically running rib 5. As a result, the containers are also transported in the longitudinal direction through the device.

Bracing elements 16 which serve to increase the flexural and torsional stiffness of the rotor are fitted inside the rotor between neighboring rings. The bracing elements 16 are arranged crosswise and together form a three-dimensional framework. In the embodiment shown in the figures, six bracing elements which extend from a particular point of one ring to a point on the other ring which is rotated through about 180° C. about the axis 10 of the rotor relative to the first-named point are arranged between two neighboring rings. Viewed in the direction of the axis 10 of the rotor, the bracing elements are at a mutual angle of 60°. The bracing elements are pipes which are joined via flanges 17 to the rings 7,8,8',8",9. These pipes are suitable for absorbing both tensile and compressive forces. As a result of using pipes as bracing elements, a high flexural and torsional stiffness can be obtained for a given weight of the rotor. This makes it possible to use a longer rotor with maximum sag remaining the same, than in the case in which the bracing elements consist of rods or wires which are intended to absorb tensile forces and can absorb hardly any or no compressive forces. Thus, for example, it is possible to use a rotor having a length of about 12 meters and a diameter of about 1 meter, which rotor has a maximum sag of less than 2 mm.

The rings of the rotor usually are fabricated from steel and the angle sections of stainless steel. In order to prevent temperature stresses from occurring in the rotor on increasing the temperature as a consequence of differences in the coefficient of expansion between the rings and the angle sections of the rotor and the pipe-like bracing elements, the pipes are fabricated as two parts, specifically a part 18 of stainless steel and a part 19 of steel, the lengths of the two parts being such that the mean coefficient of expansion of each pipe is equal to the mean coefficient of expansion of the rings 7,8,8',8",9 and the angle sections of the rotor. Thus, no additional tensions are introduced in the rotor in the event of temperature changes.

Due to the greater torsional stiffness of the rotor it is sufficient to drive the rotor only at one end by means of a shaft 3.

With the above-described construction of the rotor a greater dimensional stability is thus achieved both in relation to sagging and to torsion of the rotor both under mechanical loading and in the case of temperature variations.

I claim:

1. A device for sterilizing products packed in cylindrical containers, comprising:
   (a) an elongated, essentially cylindrical housing, the housing having a circumferential wall which is provided, on the inside thereof, with a helically running, raised rib disposed thereon;
   (b) an essentially cylindrical rotor located in the housing and which is drivable by a central shaft, the rotor defining a cage comprising:
   (1) a plurality of rings placed one behind another, the center line of which coincides with the axis of the rotor, and
   (2) a plurality of raised ribs fastened to the circumference of the rings parallel to the axis of the rotor, the outer edges of the ribs being located near the inner edge of the helically running rib on the inner wall of the housing, so that spaces are formed between the ribs for receiving the cylindrical containers; and
   (c) a plurality of bracing elements which are disposed, at an angle relative to the rotor shaft, within the rotor between neighboring rings to reinforce the rotor, said bracing elements comprising pipes, wherein each pipe is made of parts which are formed of different materials, in a ratio such that the mean coefficient of expansion of each pipe is equal to the mean coefficient of expansion of the rings and the ribs of the rotor.

2. A device as claimed in claim 1, wherein the rings of the rotor consist of steel and the ribs of stainless steel, and that each pipe consists partly of steel and partly of stainless steel.

3. A rotor for a device for sterilizing products packed in cylindrical containers, said rotor having an axis and having an essentially cylindrical shape, and defining a cage comprising:
   a plurality of rings placed one behind another, the center line of which coincides with the axis of the rotor,
   a plurality of raised ribs fastened to the circumference of the rings, the ribs being which are substantially parallel to the axis of the rotor, and
   a plurality of bracing elements which are disposed at an angle relative to the rotor axis within the rotor between rings to reinforce the rotor, said bracing elements comprising pipes;
   wherein each pipe is made of parts which are formed from different materials, in a ratio such that mean coefficient of expansion of each pipe is equal to the mean coefficient of expansion of the rings and the ribs of the rotor.

4. A rotor as claimed in claim 3, wherein the rings of the rotor consist of steel and the ribs of stainless steel, and that each pipe consists partly of steel and partly of stainless steel.

* * * * *